United States Patent [19]

van den Nieuwelaar et al.

[11] Patent Number: 5,312,291

[45] Date of Patent: May 17, 1994

[54] METHOD AND DEVICE FOR FILLETING THE BODY OF A SLAUGHTERED BIRD

[75] Inventors: Adrianus J. van den Nieuwelaar, Gemert; Petrus C. H. Janssen, Wilbertoord, both of Netherlands

[73] Assignee: Stork PMT B.V., Boxmeer, Netherlands

[21] Appl. No.: 2,472

[22] Filed: Jan. 8, 1993

[30] Foreign Application Priority Data

Jan. 10, 1992 [NL] Netherlands .................. 9200037

[51] Int. Cl.$^5$ ............................................. A22C 21/00
[52] U.S. Cl. ............................. 452/165; 452/169; 452/166
[58] Field of Search ............... 452/165, 166, 169, 170, 452/149

[56] References Cited

U.S. PATENT DOCUMENTS

| | | | |
|---|---|---|---|
| 4,477,942 | 10/1984 | Martin et al. | 452/169 |
| 4,503,587 | 3/1985 | Martin | 452/169 |
| 4,648,155 | 3/1987 | Burnett | 452/169 |
| 4,651,383 | 3/1987 | Van Der Eerden | 452/169 |
| 4,827,570 | 5/1989 | Scheier et al. | 452/169 |
| 4,873,746 | 10/1989 | Scheier et al. | 452/169 |
| 4,920,610 | 5/1990 | Callsen et al. | 452/169 |
| 4,937,918 | 7/1990 | Martin | 452/169 |
| 4,993,115 | 2/1991 | Hazenbroer | 452/169 |
| 5,083,974 | 1/1992 | Martin et al. | 452/169 |

FOREIGN PATENT DOCUMENTS 0168865 1/1986 European Pat. Off. ...... A22C 21/00
0459580 12/1991 European Pat. Off. ...... A22C 21/00

Primary Examiner—Willis Little
Attorney, Agent, or Firm—Deveau, Colton & Marquis

[57] ABSTRACT

A method and device for filleting the body of a slaughtered bird, or a part thereof, the method having the following steps: making incisions in the shoulder joints while the connection between the muscles to be filleted and their wing bones remains intact; tearing away a fillet from the ribs by exerting a force which acts upon the wing concerned and is directed essentially away from the ribs; and breaking the connection between fillet and wing bone. The bird, or a part thereof, is fixed on a supporting element which is movable along a predetermined path at a predetermined speed, and which can be tilted from a neutral position, in which the shoulder side of the bird is facing upwards, to a breast position, in which the breast side of the bird is facing upwards, and to a back position in which the back of the bird is facing upwards. The device has a filleting station with a set of guides, each having a guide edge, which guide edges are intended for resting near the point of attachment of the muscle on either side thereof against the wing bone or covering tissue thereof, while the guides run in such a way that, prior to the fillet being torn away, the wing is guided to the side of the guides facing away from the ribs.

28 Claims, 17 Drawing Sheets

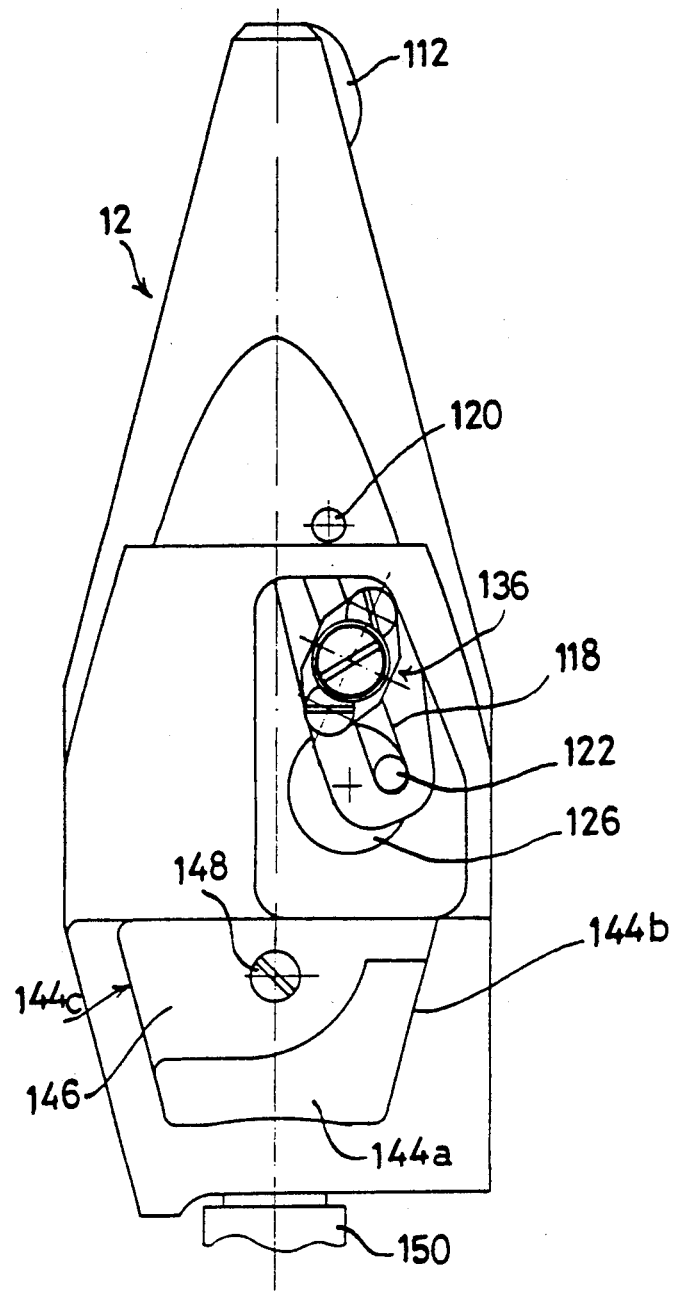
FIG: 6.

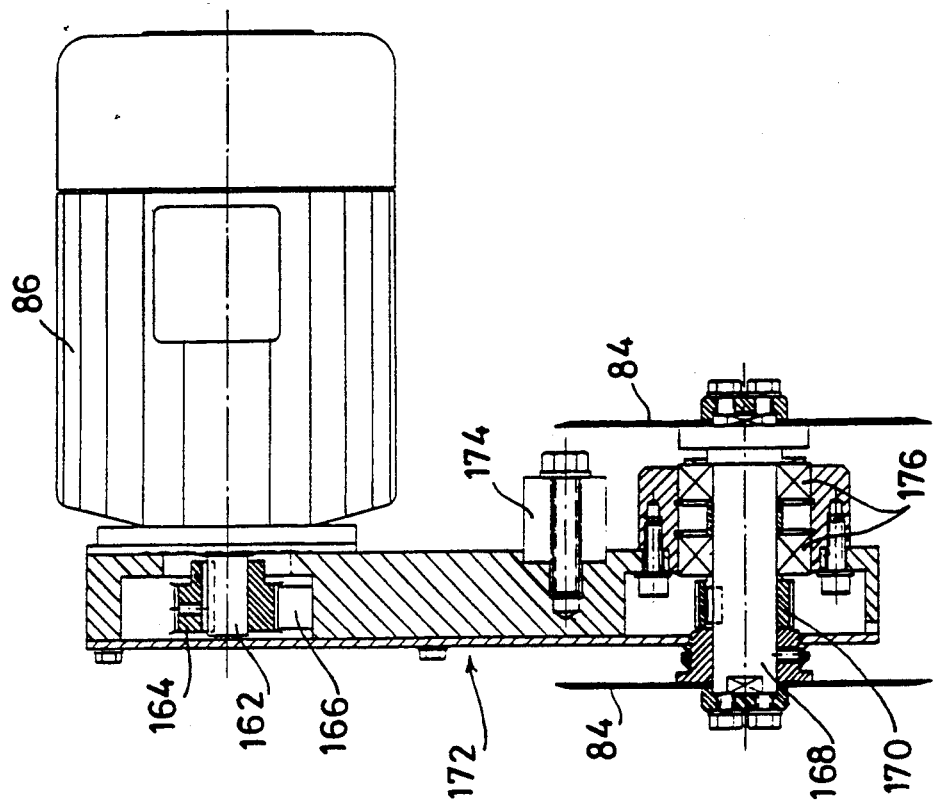
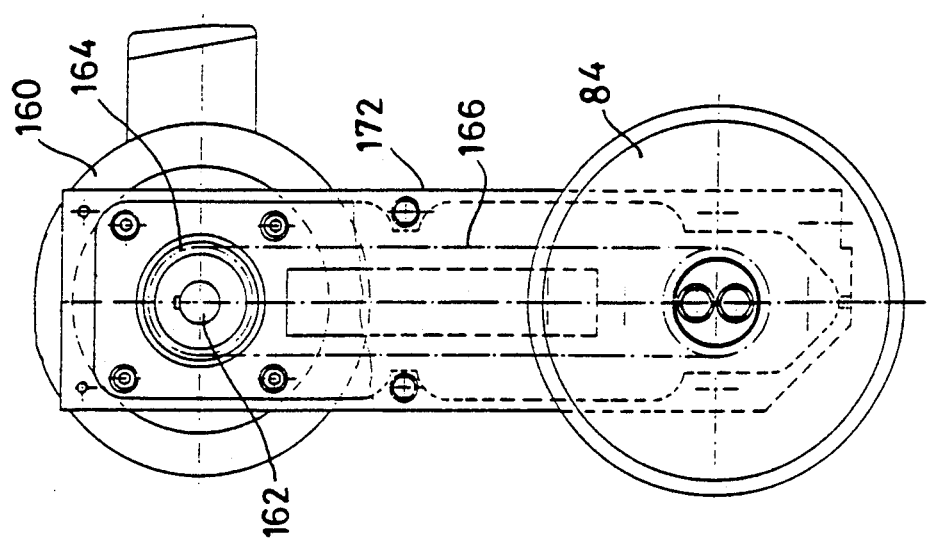

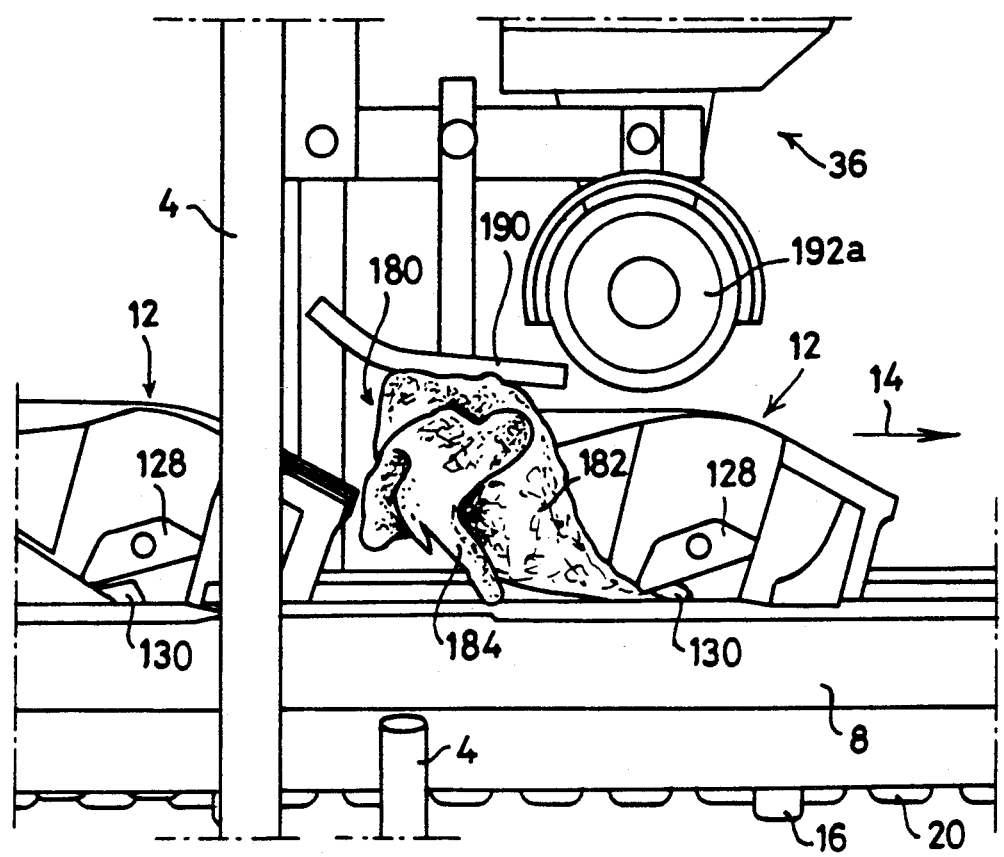
FIG:10.
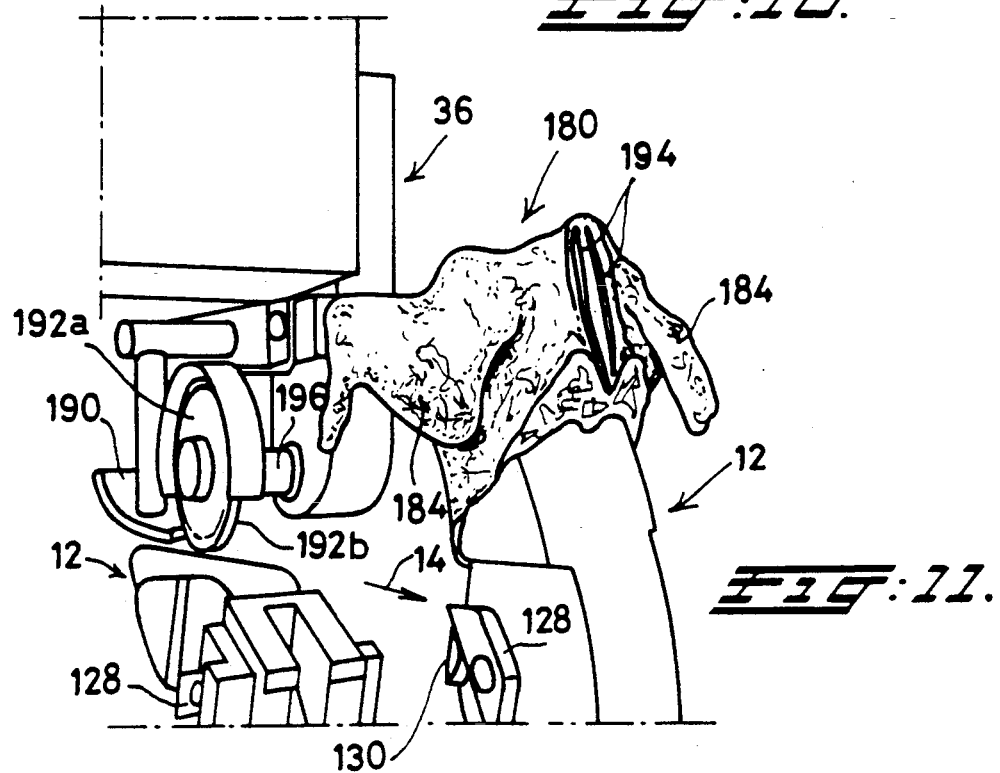
FIG:11.

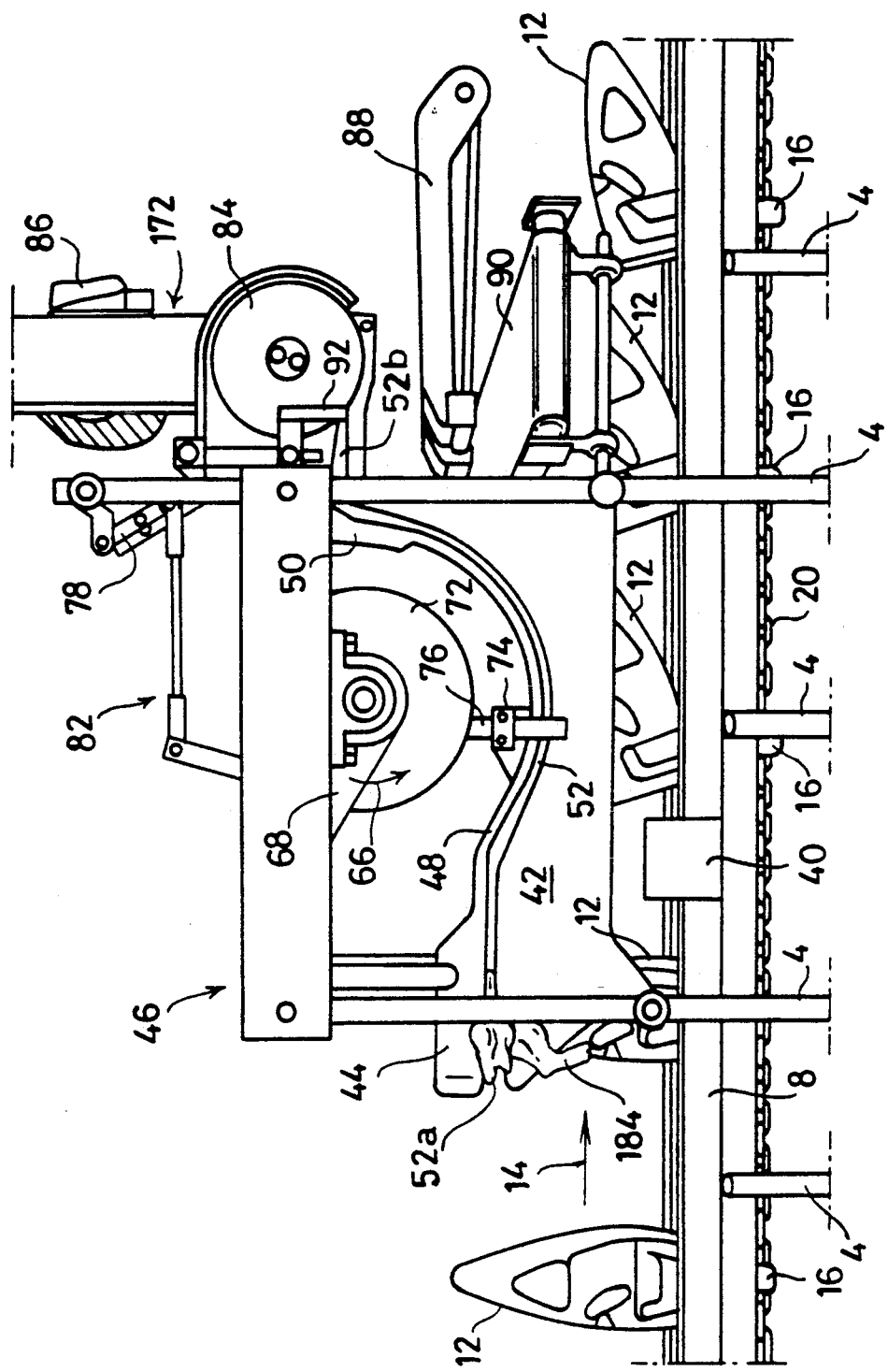

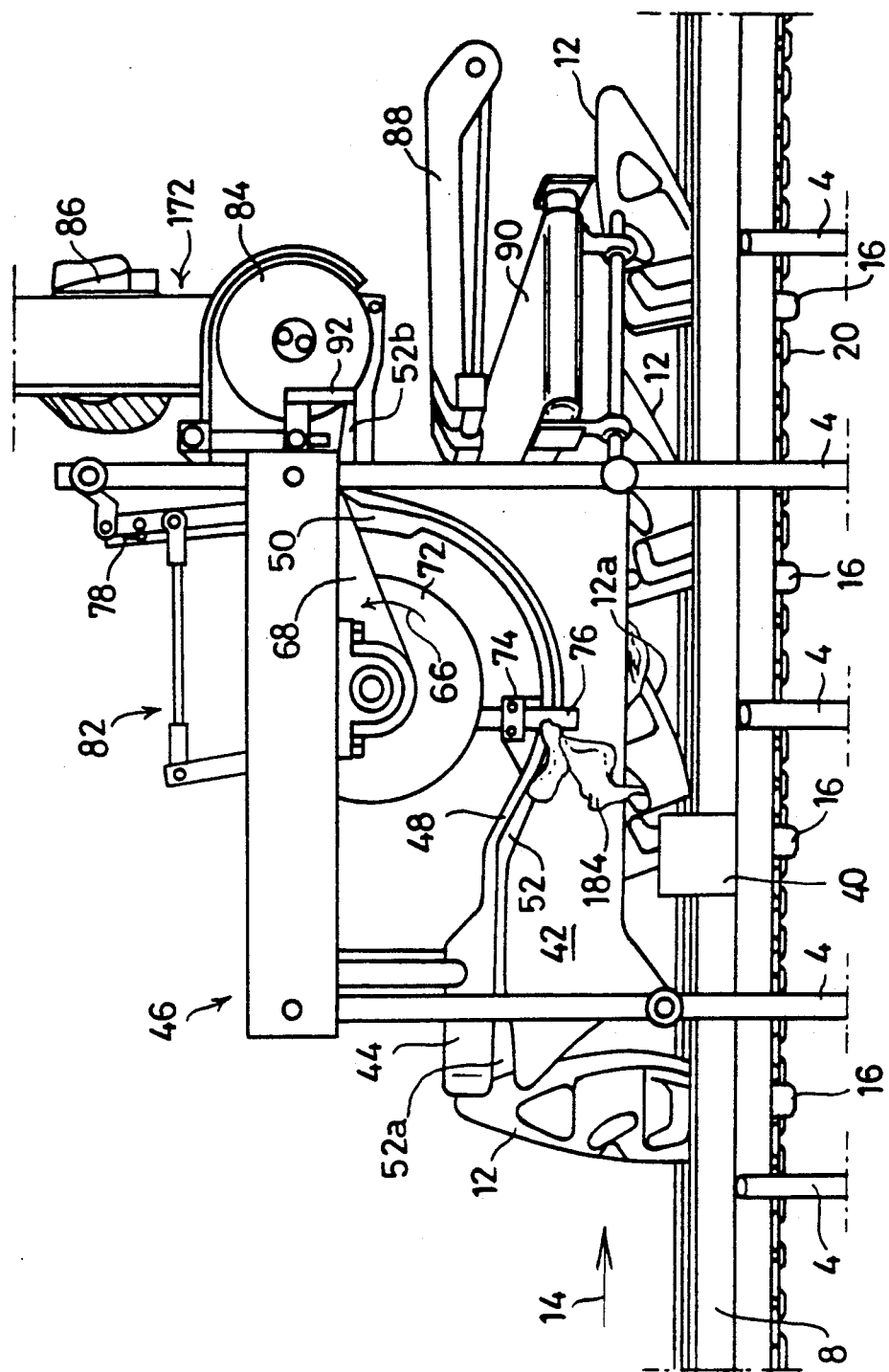

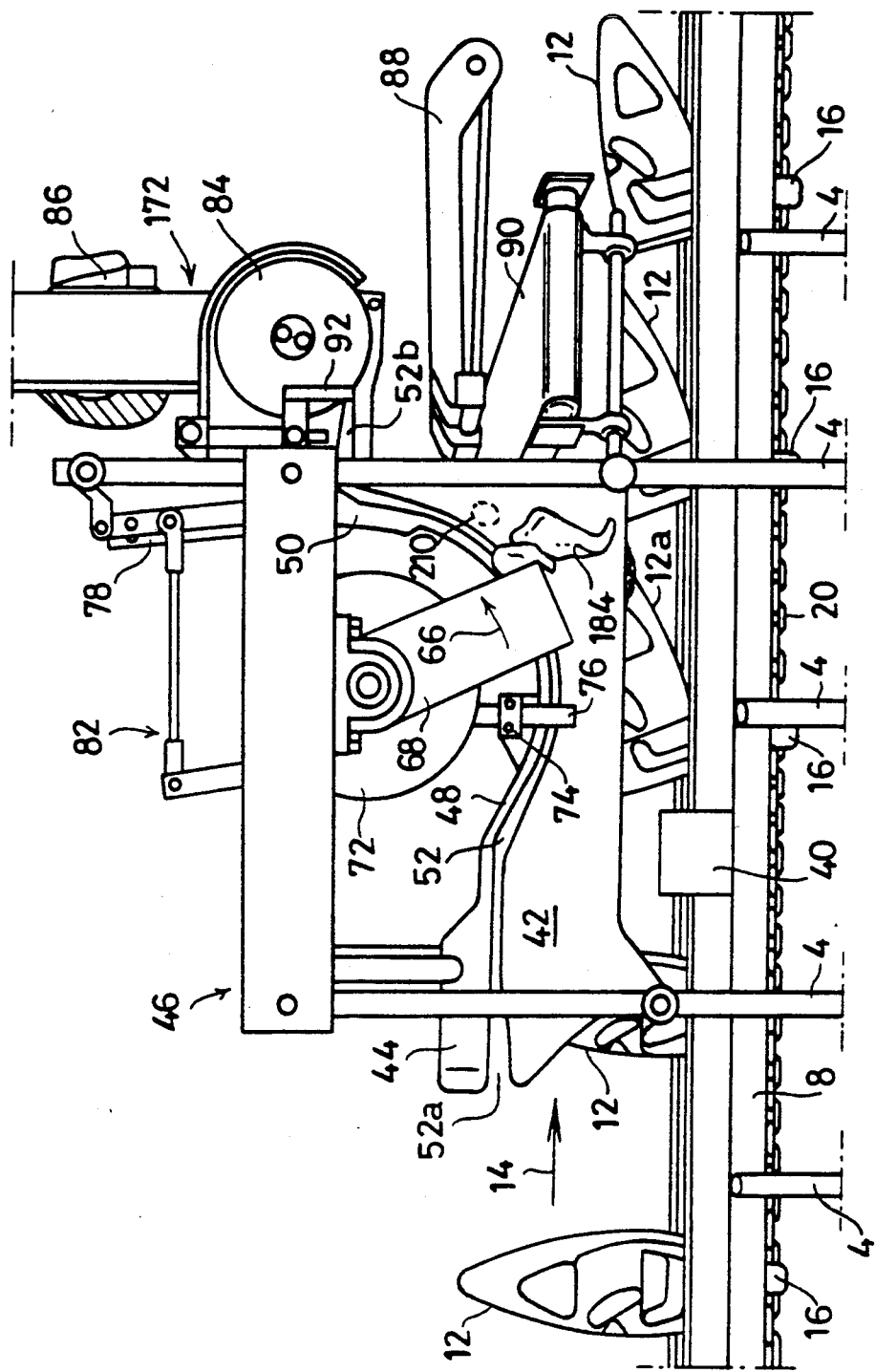

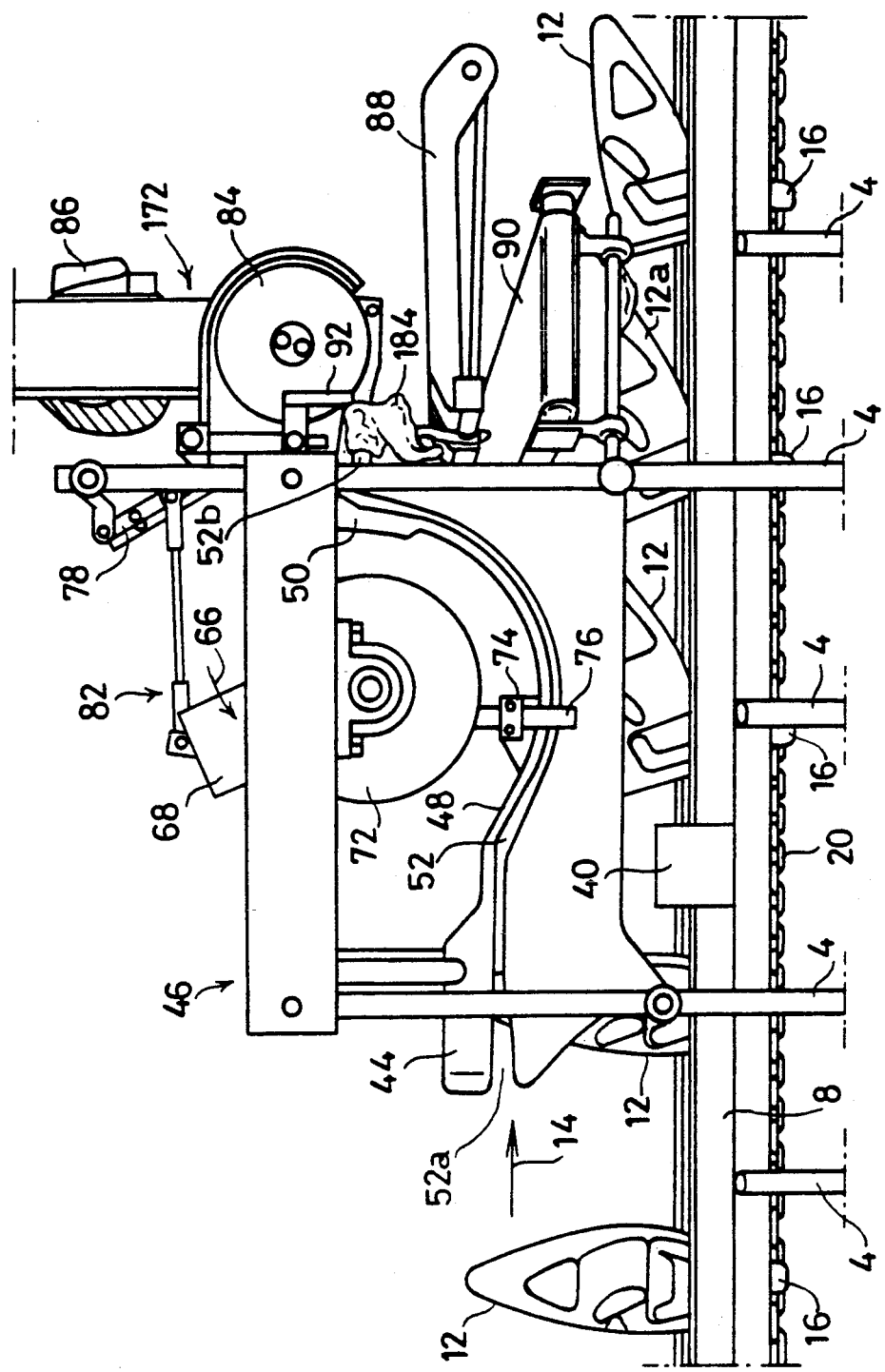

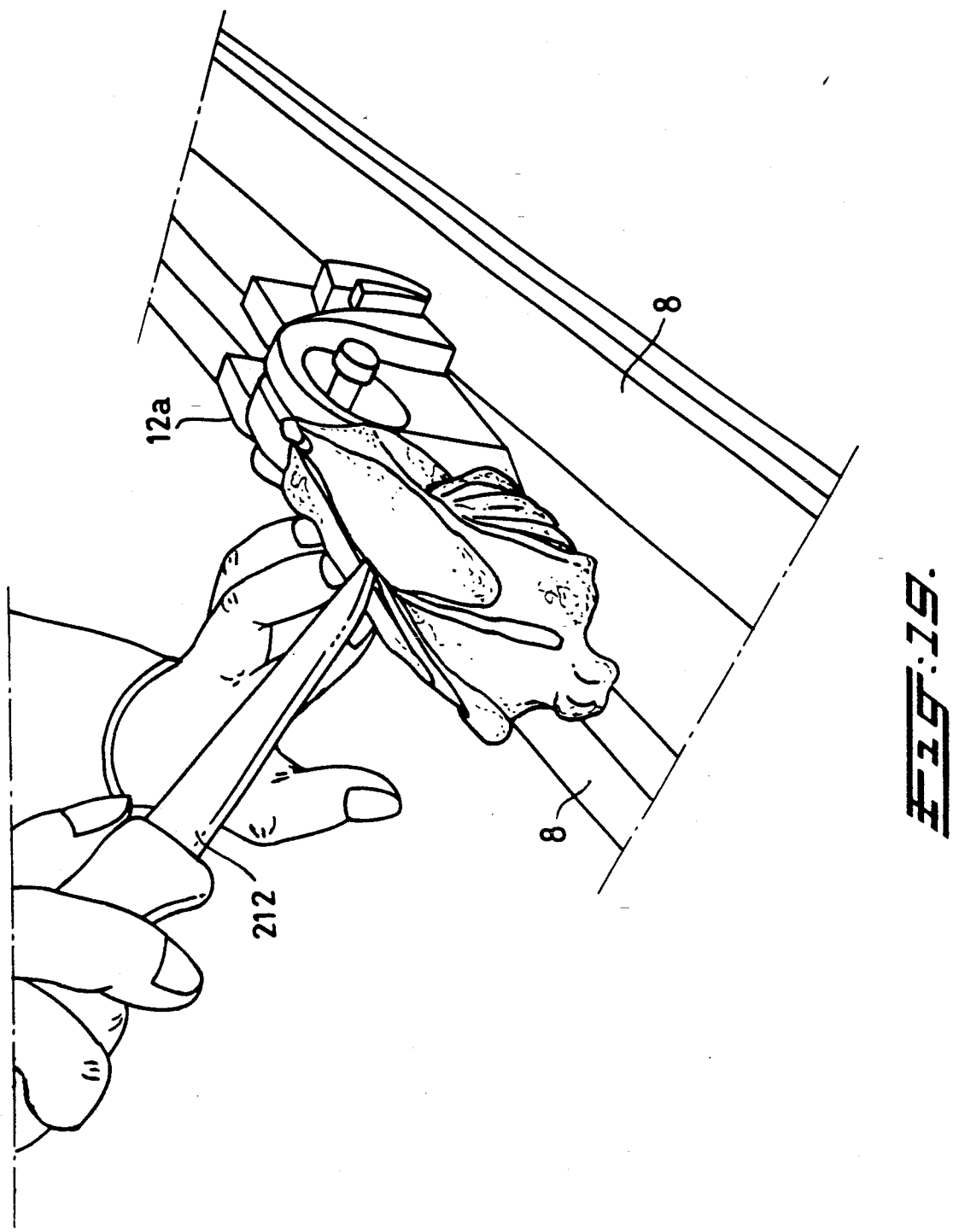

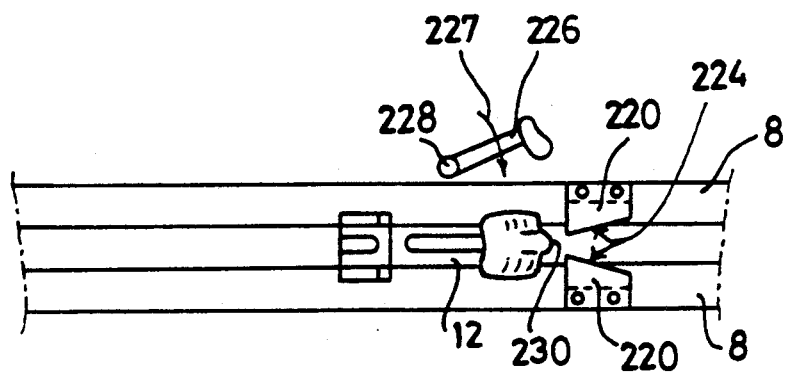
_Fig: 20a._
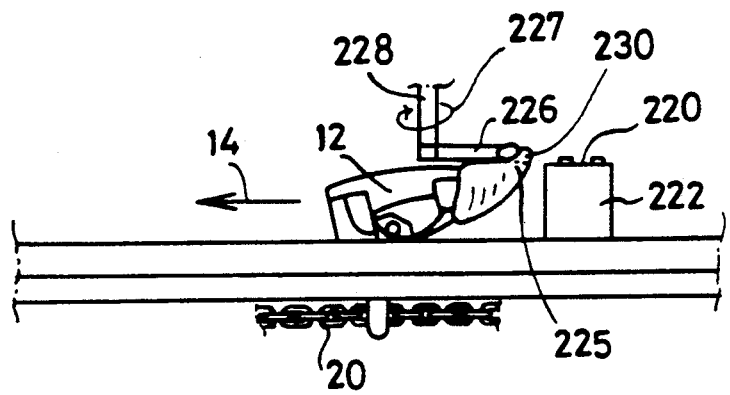
_Fig: 20b._

METHOD AND DEVICE FOR FILLETING THE BODY OF A SLAUGHTERED BIRD

BACKGROUND OF THE INVENTION

This invention relates to a method for filleting the body of a slaughtered bird, or a part thereof, comprising the following steps: making incisions in the shoulder joints while the connection between the muscles to be filleted and their wing bones remains essentially intact; tearing away a fillet from the ribs by exerting a force which acts upon the wing concerned and is directed essentially away from the ribs; and breaking the connection between fillet and wing bone. This invention also relates to a device for carrying out said method.

DISCUSSION OF THE PRIOR ART

A method and a device for obtaining breast fillets are known from U.S. Pat. No. 4,937,918. This publication describes a device with an endless conveyor on which supporting elements are fixed at regular intervals. The supporting elements are essentially the shape of a truncated cone and, in an initial position, extend perpendicular to the conveyor, while they can be tilted in the direction of movement of the conveyor. The upright supporting elements, on each of which a front half of a slaughtered bird is placed, are supplied to a filleting station with the back of the front half in the direction of movement of the conveyor. It is ensured here that the shoulder joints have been severed. At the position of the filleting station the wings of the front half of the slaughtered bird are wedged between the links of a conveyor chain moving along with the conveyor. The supporting element is then tilted in the direction of movement of the conveyor, so that the breast side of the front half is facing upwards. The wedged wings in the first instance are moved along with the supporting element, but in the second instance the path of the wings diverges from that of the conveyor, with the result that the breast fillet (pectoralis major) is torn away from the front half, and the two parts then go separate ways. The remaining part of the front half, which is situated on the supporting element, undergoes a further operation to obtain the underfillets (pectoralis minor), and is then removed from the device. The breast fillet is conveyed hanging by the wings to a separating station, for separating the wings from the breast fillet.

A drawback of the known filleting device is that its operation entirely depends on the reliability with which the wings and the chest can be conveyed along in different directions for exerting a tearing-away force on the breast fillet. The very important factor here is that the wings and the wedging of the wings between the links of the conveyor chain should be able to absorb a certain pulling force. In practice, this condition cannot be met in a number of cases.

Firstly, wedging the wings between the links of a conveyor chain can take place reliably only if the wings have certain minimum dimensions both in the longitudinal and in the transversal direction. This condition will not always be met, with the result that the wing in question can come out of the wedged position between the links of the conveyor chain, and the intended tearing-away action is not obtained.

Secondly, the position of the wings must be such that they can be gripped at the correct position by the links of the conveyor chain. A position of the wings differing from the planned position results in insufficient wedging, or results in the wings being crushed by the conveyor chain.

Thirdly, it frequently occurs that the wings of the birds have been broken for various reasons prior to the filleting operation. It goes without saying that the strength of the wing is greatly reduced by this, and there is a risk of the wing itself being torn off when the breast fillet is being torn away, which again means that the planned filleting action is not obtained.

All the reasons mentioned above mean that a breast fillet in the device is not, or is only partially, torn away from the breast of the slaughtered bird, with the result that the products concerned have to be filleted in another, more time-consuming and more expensive way.

SUMMARY OF THE INVENTION

The object of the invention is to eliminate the above-mentioned drawbacks and to make the yield of the filleting operation as high as possible.

This object is attained according to the invention by a method for obtaining both breast and back fillets in which the fillet is torn away from the ribs by exerting a pressure force on the wing bone near the point of attachment of the muscle. Through the use of this method, a reliable filleting operation is obtained in all circumstances, and very largely independent of the wing size, wing position, wing strength and wing breakage if it occurs. The filleting operation can, of course, be carried out on the carcass of a whole slaughtered bird, but also on the front half thereof, or even on a part comprising only a part of the chest at the position of the breast fillet. The shoulder joint incision can be made between the oval joint ball of the wing bone and the joint socket at the chest side, but it is also possible to cut through the joint ball, through the wing bone, or through the joint socket.

In the filleting operation the object is to separate the maximum quantity of saleable product from the ribs. For this, prior to making the incisions in the two shoulder joints, incisions are made through the skin on either side of the backbone, which incisions extend from the neck to the other end of the backbone, and parallel thereto.

The efficiency of the filleting operation is increased further if the incisions extend through the two shoulder joints from the wishbone at the breast side to the shoulder blade at the back.

According to the prior art, for a filleting operation the bird, or a part thereof, is fixed on a supporting element which is movable along a predetermined path at a predetermined speed, and which can be tilted from a neutral position, in which the shoulder side of the bird is facing upwards, to a breast position, in which the breast side of the bird is facing upwards. According to a particularly advantageous aspect of the present invention, the supporting element is now also tiltable towards a back position in which the back of the bird is facing upwards. Such a tilting of the supporting element particularly simplifies the making of incisions through the skin on either side of the backbone, because it is easily accessible in the back position of the supporting element. Such a supporting element also makes it easy to obtain back fillets. The supporting element thus developed provides the optimum ease of manipulation of the bird for all operations to be carried out thereon, i.e. both the mechanical operations and the operations to be carried out manually.

An additional degree of freedom can be obtained through the supporting element being disposed so that it pivots about an axis perpendicular to the direction of movement.

The highest weight output when filleting the front half is obtained by following the contour of the wing bone near the point of attachment of the muscle during the breaking of the connection between fillet and wing.

A device for carrying out the method according to the invention comprises according to the prior art a conveyor to which a number of supporting elements are connected, which supporting elements are for fixing thereon the slaughtered bird or a part thereof; a shoulder joint incision station for cutting into the shoulder joints, while the connection between the muscles to be filleted and their wing bones remains essentially intact; a filleting station with a second conveyor for guiding the wings away from the path of the supporting elements in such a way that the muscle which is connected to each wing and is to be filleted is torn away from the ribs connected to the supporting element; and a separating device for separating the wings from the fillet. According to the invention, the second conveyor comprises a set of guides, each with a guide edge, which guide edges are intended for contacting the wing bone or covering tissue thereof near the point of attachment of the muscle on either side thereof, while the guides run in such a way that, prior to the fillet being torn away, the wing is guided to the side of the guides facing away from the ribs. The guides define a path for the wings, which path can be selected as desired, and the force required for tearing away a fillet is produced by the guide edges of the guides exerting a pressure force on the wing bones. As already stated, it is immaterial what the dimensions of the wings are or what condition they are in, so that the intended filleting effect is obtained in all circumstances.

If the guides form a groove, a pushing element which can be moved along the groove is preferably used for moving the wing in the longitudinal direction of the groove. In another possible embodiment the guides are formed by a continuous guide edge, in the longitudinal direction of which a guide element provided with projections facing the guide edge can be moved, for moving the wing in the longitudinal direction of the guide edge. The guide element can in this case comprise a disc which is provided with radially directed projections along the periphery, or it can comprise a chain with projections directed at right angles to the links thereof.

For making the intended incisions on either side of the backbone, use is made of a back incision device which is disposed upstream of the filleting station along the path of the conveyor. This back incision device comprises two cutting elements placed at a distance from each other and operating in parallel. The back incision device operates on a body part of a bird wedged on a supporting element in the back position thereof. It will be clear that a device similar to the back incision device can be used to operate on a body part of a bird wedged on a supporting element in the breast position thereof for cutting the breast fillet in half, cutting on both sides of the breast bone with the two cutting elements of the incision device placed at a distance from each other and operating in parallel.

As is known, the supporting element has an end which is essentially tapered, e.g. the shape of a truncated cone, and which is adapted for supporting a part of the body of the bird at the inside thereof. In a preferred embodiment the base of this supporting element is guided on either side between a set of rails, the bases of the supporting elements being mutually coupled together by means of a chain or the like. A particularly flexible arrangement is obtained through such a layout, and it is not necessary for the conveyor to work in a straight line, as is usual according to the prior art; any desired path of the conveyor is possible in principle without any problem.

For setting different tilted positions of the supporting elements, the latter are connected to the bases thereof in such a way that they pivot about a horizontal axis, the supporting elements being provided with three slide surfaces which are directed perpendicular to a vertical plane, and which can interact with the top side of the rails for holding the supporting element tilted in a position determined by one of the three slide surfaces during conveyance of said element along the rails. After a tilting of a supporting element has been brought about by means of a control station or the like, the tilted position can be retained for a certain processing operation through the use of the slide surfaces. If the base of a supporting element is connected to the remaining portion of the supporting element so that it can pivot about a vertical axis, relative to the base thereof, the supporting elements can be rotated into any desired positions for a more efficient processing of the bird or a part thereof fixed thereon.

The breast has to be able to withstand all operations related to the filleting operation without the body or a part thereof shifting or twisting on the supporting element, or being damaged, breaking off or becoming detached from it. For this purpose, the device comprises a supporting element with a hook of which the end is directed towards the base of the tapering end, and is adapted to clamp the part of the body of the bird on the supporting element, and which hook is adapted to be moved in the longitudinal and transverse direction relative to the surface of the tapering end by means of control elements connected thereto which are adapted to interact with control stations disposed along the path of the supporting element. Such a hook can grip over the breastbone at the level of the wishbone, for wedging the body and the tissues connected thereto on the supporting element. This ensures that the body is held immovable precisely at the point which is naturally designed to absorb the greatest mechanical stresses.

Preferably, the hook is slidable in the direction of the surface of the tapering end towards the base thereof under the force of a resilient member. This provides the great advantage that the hook presses down the body part of the bird along the tapered end of the supporting element just until the body part is wedged securely on said tapered end and the force of the resilient member on the hook becomes insufficient to move the body part further. The dimensions of body parts being different for individual birds, thus the wedging is automatically adapted to the actual size of a body part, always providing a reliable fixation of the body part without damaging it.

In a preferred embodiment the hook is U-shaped and has a short leg and a long leg, which long leg lies essentially inside the supporting element and is both tiltable and slidable for moving the short leg in the longitudinal and transverse direction relative to the surface of the tapering end. Preferably the long leg of the hook is composed of a strip with two essentially parallel grooves which are directed essentially parallel to the surface of the cone-shaped end, a first guide pin fixed to the supporting element projecting into the first groove perpendicular to the plane of the strip, and a second guide pin which is disposed eccentrically on a hingable element projecting into the second groove.

The design of the hook is such that the short leg of the hook can be moved along the path determined by the grooves and the first and second guide pins when the hingable element is in a particular position, along the surface of the cone-shaped end of the supporting element, by a first hook operating element which is connected to the strip and can interact with a control station disposed next to the path of the supporting element. The short leg of the hook can also be moved along the path determined by the grooves and the first and second guide pins, at right angles to the surface of the cone-shaped end of the supporting element, by a second hook operating element which is connected to the hingable element and can interact with a control station disposed next to the path of the supporting element.

In the light of the above, in which for tearing away the fillet use is made of guides for guiding a wing bone near the point of attachment of the breast muscle, it is advantageous if the separating device for separating the wings from the fillet comprises a set of guides, each with a guide edge, which guide edges are designed to rest against the wing bone or covering tissue thereof near the point of attachment of the muscle at either side thereof, the guides running in such a way that, prior to the separation of the wing from the fillet, the wing is guided to the side of the guides facing away from the ribs, which guides are bounded downstream by a cutting element for cutting off the fillet.

In the same way as already indicated above for tearing away of the breast fillet from the chest of the slaughtered bird, the guides can form a groove, while a pushing element is provided which is movable along each groove, for moving the fillet and the wing in the longitudinal direction of the groove. It is, however, also possible for the guides to be formed by a continuous guide edge, in the longitudinal direction of which a guide element provided with projections pointing towards the guide edge can be moved, for the purpose of moving the fillet and the wing in the longitudinal direction of the guide edge. The guide element can consist of a disc which is provided with radially directed projections along the periphery, or it can be a chain with projections directed at right angles to the links thereof.

A preferred embodiment comprises a stop disposed at a side of the guides facing away from the ribs, the distance between the stop and the guides being smaller than the greatest dimension and greater than the smallest dimension of a wing bone near the point of attachment of the muscle to be filleted. The wing bone can consequently pass the stop only in a way predetermined by the distance between the guides and the stop, which means that the contour of the wing bone is followed during the cutting off of the wing.

The claims and advantages will be more readily appreciated as the same becomes better understood by reference to the following detailed description and considered in connection with the accompanying drawings in which like reference symbols designate like parts.

BRIEF DESCRIPTION OF THE DRAWINGS

FIG. 6 shows an elevation of the other side of the supporting element according to FIG. 4;

FIG. 7 shows a partially cut-away side view of a part of the separating device for separating the wings from the breast fillet;

FIG. 8 shows a partial cross-section of the device according to FIG. 7;

FIG. 10 shows a side view in perspective of a station for making incisions along the backbone, on an enlarged scale;

FIG. 11 shows a rear view in perspective of the station according to FIG. 10 and the incisions obtained in the front half;

FIG. 14 is a side view in perspective in which the first stage of the filleting operation carried out in the filleting station is shown;

FIG. 15 shows a second stage of the operation in the filleting station according to FIG. 14;

FIG. 16 shows a third stage of the operation in the filleting station according to FIG. 14;

FIG. 17 shows a fourth stage of the operation in the filleting station according to FIG. 14;

FIG. 19 illustrates the separation of the underfillets from the front half; and

FIGS. 20a and 20b show a top view and a side view of an optional neck part separating station for separating the neck part from the carcass.

DESCRIPTION OF THE PREFERRED EMBODIMENTS

Figure 1:
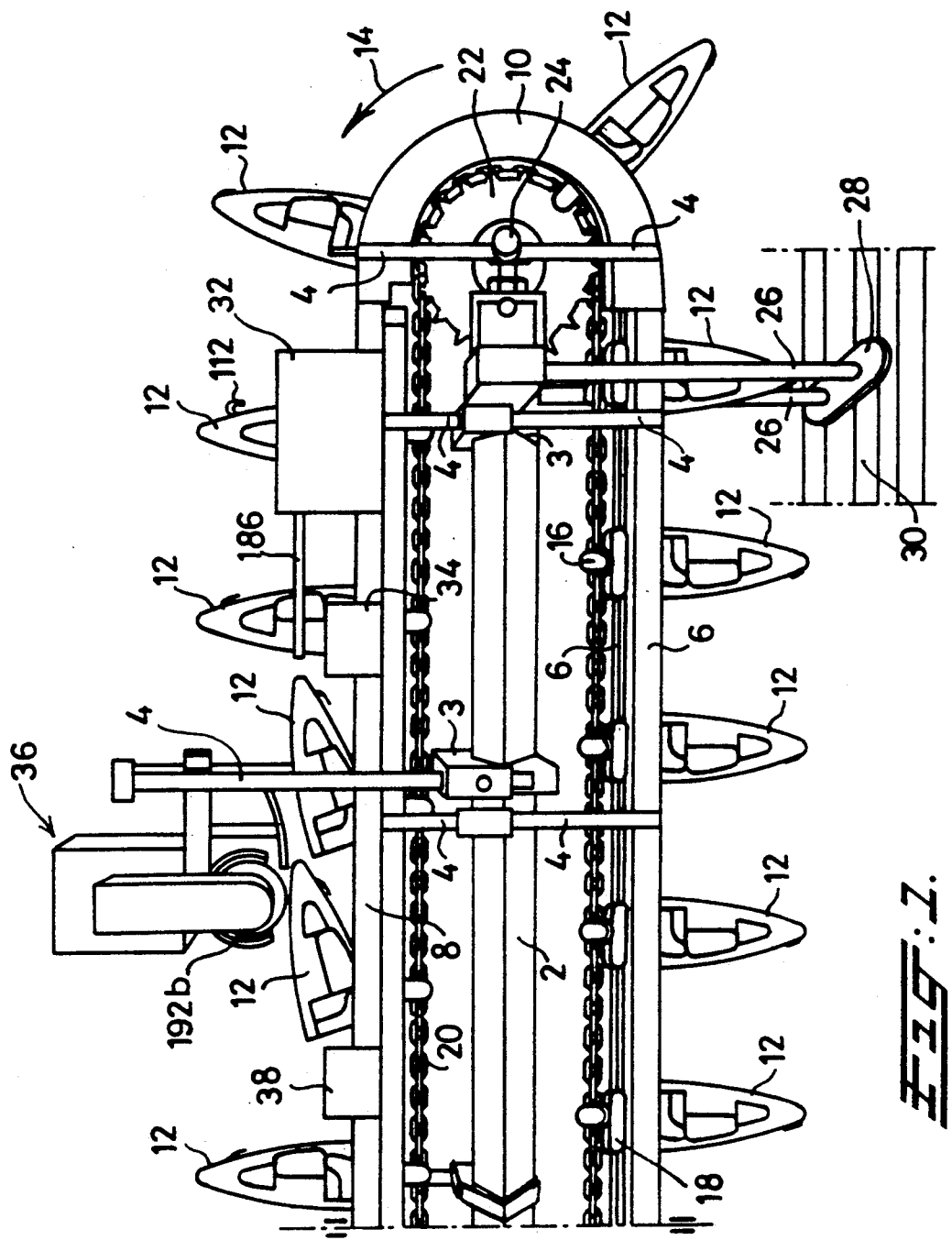
FIG. 1 shows a side view in perspective of a first part of a device according to the invention.

FIG. 1 shows a support beam 2, on which support rods 4 are fastened by means of clamps 3, for fixing the component elements of the frame of the device. A set of lower rails 6 and a set of upper rails 8 with an essentially rectangular cross-section are fixed to one of the ends of the support rods 4. At the ends of the rails 6 and 8 shown on the righthand side in the figure said rails are interconnected by means of semi-circular coupling rails 10. The rails 6, 8 and 10 are of such dimensions that a path of essentially uniform dimensions is produced between them, along which supporting elements 12 can be moved in the direction of arrow 14. During this movement, the supporting elements 12 slide along the outside of the rails 6, 8 and 10, and they have a foot 16 which projects inwards between the rails 6, 8 and 10 and is provided with a guide collar 18 for defining the position of each supporting element 12 in the transverse direction relative to the rails 6, 8 and 10. The feet 16 are interconnected by means of a chain 20 which is guided around a sprocket 22, which in turn is driven in a manner not shown in any further detail by means of a shaft 24. The supporting elements 12 can thus be moved along the rails 6, 8 and 10 at regular intervals from each other in the direction of the arrow 14.

The device rests by means of legs 26 on a plate 28 which is placed on a floor 30. The supporting elements 12 conveyed along the legs 26 are ready for receiving a front half of a slaughtered bird on each of them. The front halves are then conveyed along the rails 8 at the top side of the device, for filleting the front half. The supporting elements 12 in this case pass in succession a hook operating station 32, for operating the hook of the supporting elements 12, the operation of which will be explained in greater detail below with reference to FIGS. 4, 5 and 6, a tilting station 34 for tilting a passing supporting element 12 in such a way that the back of the front half fixed on the supporting element 12 is facing upwards, a cutting device 36, which will be discussed below in detail with reference to FIGS. 10 and 11, and a second tilting station 38 for tilting a supporting element 12 out of the back position thereof to a neutral position thereof, in which the shoulder side of the front half is facing upwards.

Figure 2:
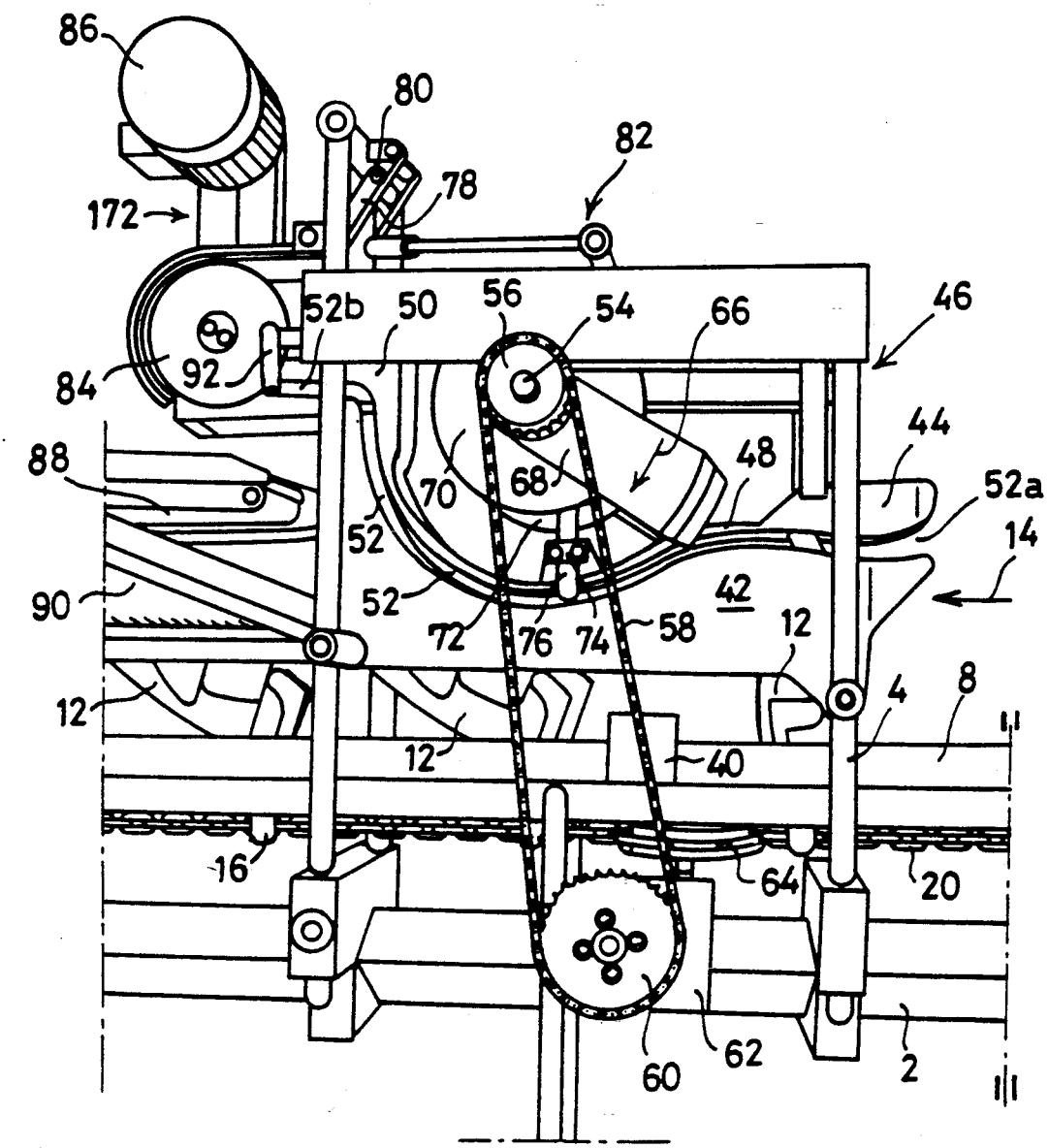
FIG. 2 shows on a larger scale a side view in perspective, connecting to FIG. 1, of a second part of the device according to the invention.

FIG. 2 shows a filleting station to which the supporting elements 12 are conveyed in their neutral position, and in which on passing a third tilting station they are tilted in such a way that the breast side of the front half fixed on a supporting element 12 is facing upwards. Above the rails 8, on either side of the path of the supporting elements 12, lower guide plates 42 and upper guide plates 44 are fixed in a sub-frame 46, which upper guide plate 44 merges in the direction of the arrow 14 into a guide 48, which in turn merges into an end guide plate 50. The lower guide plates 42, upper guide plates 44, guides 48 and end guide plates 50 define two guide grooves 52 with a tapering feed end 52a. A shaft 54 is also supported in a manner not shown in any further detail in the sub-frame 46, which shaft is driven by the chain 20 in the direction of the arrow 66 by means of first gear wheel 56, chain 58, second gear wheel 60, right-angle transmission 62 and drive gear wheel 64 meshing with the chain 20. First pushing elements 68, which are movable along the guide groove 52, and discs 70 and 72 are fixed to the shaft 54 on the outside of the guide plates 42, 44 and 50 and the guide 48. At right angles to the guide groove, blocking rods 76 can be moved upwards and downwards along guides 74 by a curved track control device, which is not shown in any further detail, at the side of the discs 70 and 72 facing away from the pushing elements 68. A second pushing element, not shown in any further detail, is provided at the outlet end 52b of the guide groove 52, between the grooves 52b disposed on either side of the path of the supporting elements 12, which pushing element is movable along the grooves 52b and is fixed to rods 78 which pivot about a shaft 80 and can be moved by means of a linkage gear 82. The movement of the linkage gear 82 is controlled by an eccentric mechanism, not shown in any further detail, on the shaft 54.

Figure 18:
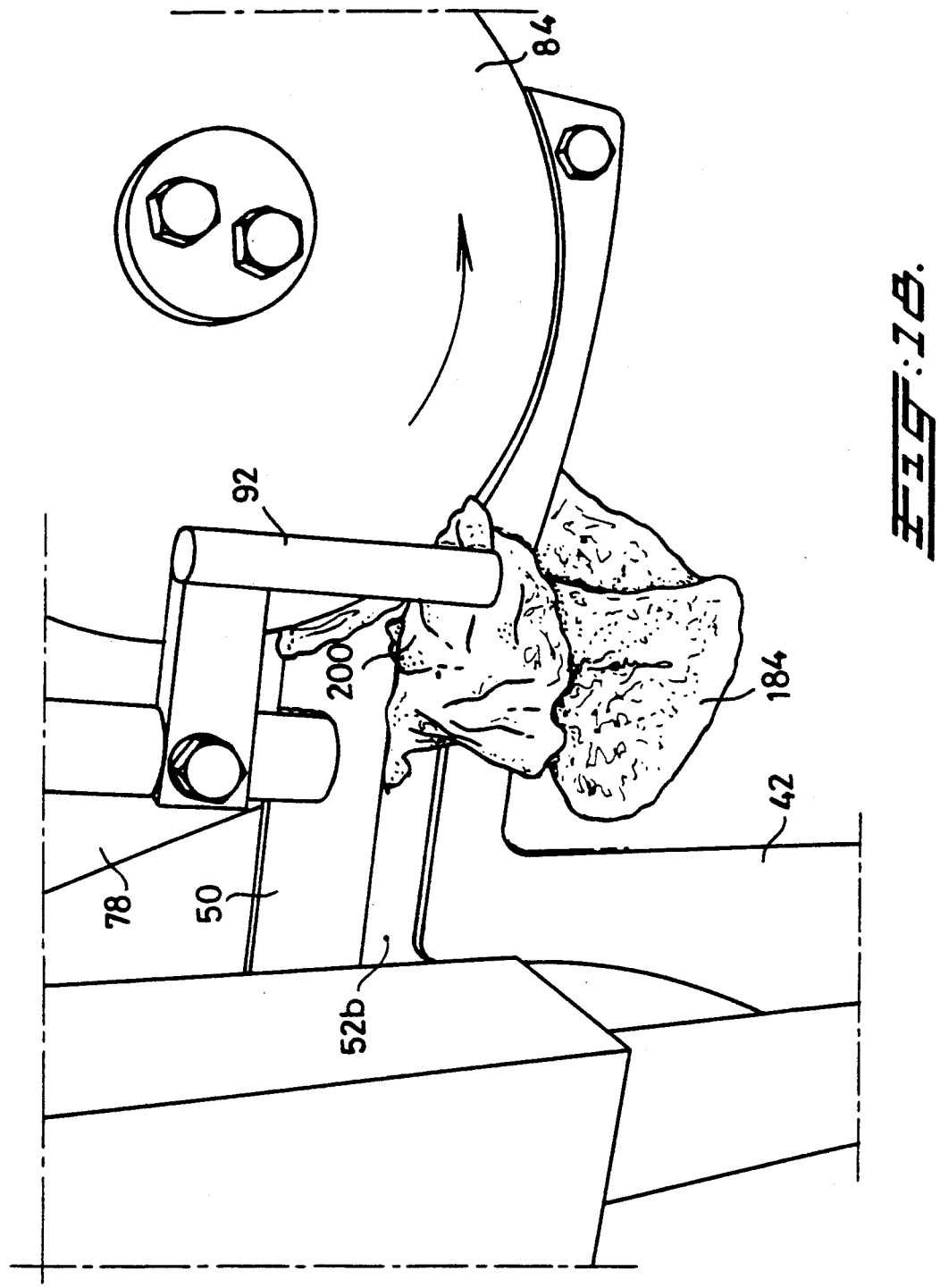
FIG. 18 shows on an enlarged scale an elevation in perspective of a detail of the separating device for separating the wings from the breast fillet.

The outlet ends 52b of the guide grooves 52 are shut off, viewed in the direction of the arrow 14, by rotating cutters 84 which are driven by a drive motor 86 by means of a suitable belt or chain drive, which last-mentioned elements are shown in detail in FIGS. 7 and 8. Disposed below the cutters 84 are two parallel wing conveyor belts 88 which are spaced apart and extend in the direction of the arrow 14. A breast fillet conveyor belt 90 extends below the wing conveyor belts 88 at right angles to the rails 8. Finally, a stop 92, which will be described in further detail below with reference to FIG. 18, is fixed on sub-frame 46.

Figure 3:
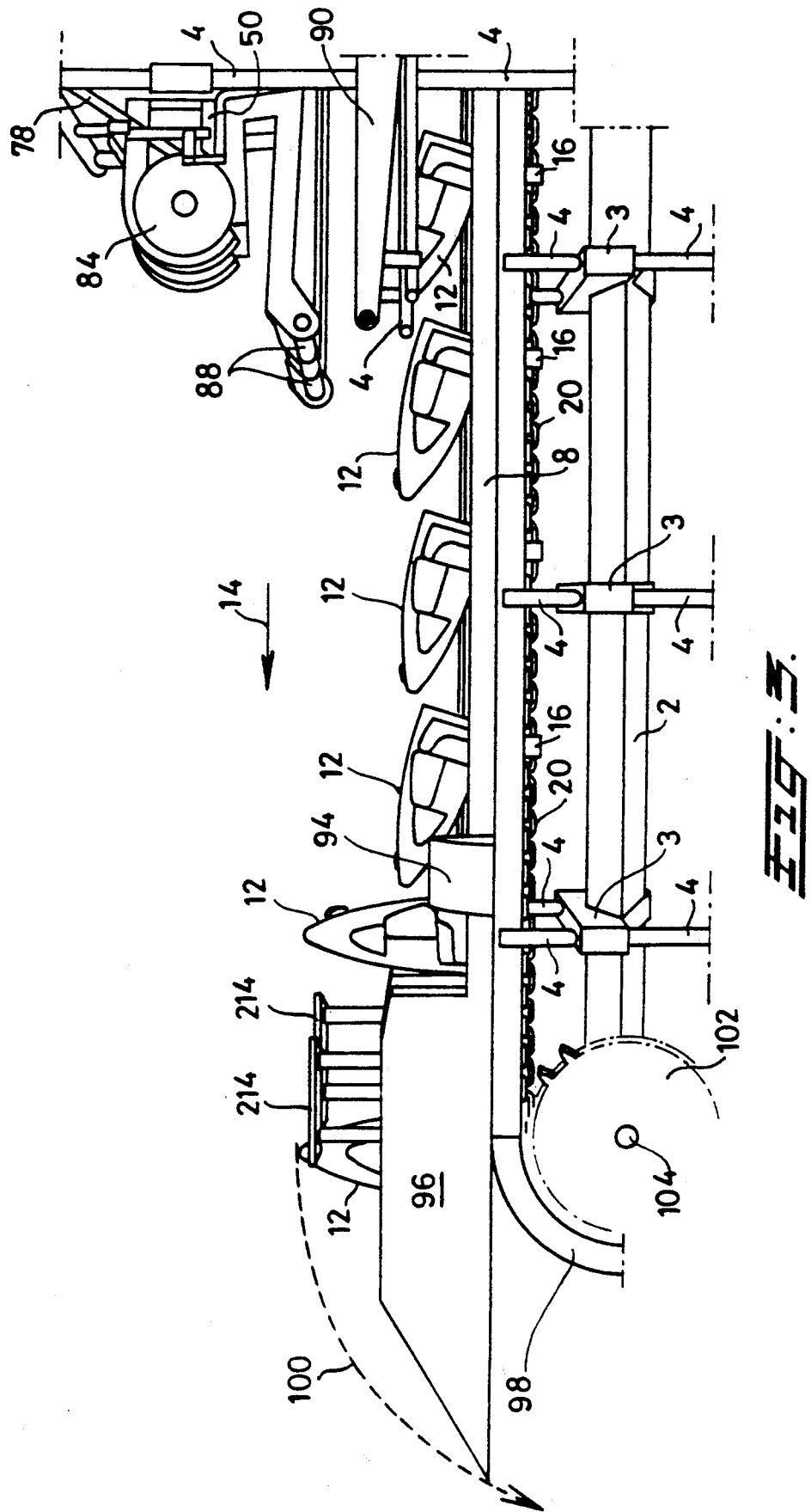
FIG. 3 shows a side view in perspective, connecting to FIG. 2, of a third part of the device according to the invention.

FIG. 3 shows how after passing a fourth tilting station 94 the supporting elements 12 are returned to their neutral position again. The supporting elements then pass an ejection station 96, in which firstly the fixing of a front half on a supporting element 12 by means of the hook in the supporting element is undone, and subsequently the front half is pressed off the top end of the supporting element, when these supporting elements are conveyed along semi-circular coupling rails 98 to the lower rails 6. The top of a supporting element 12 in this case follows the path indicated by a dashed line 100. The chain gear wheel 102, rotatable about a shaft 104, guides the chain 20. The part of the device effecting the filleting has thus been described in broad outline.

For cleaning the supporting elements, spraying devices can be fitted all the way round the rails 6 and the path on it of the supporting elements, for spraying cleaning liquids on the supporting elements.

Figures 4, 5:
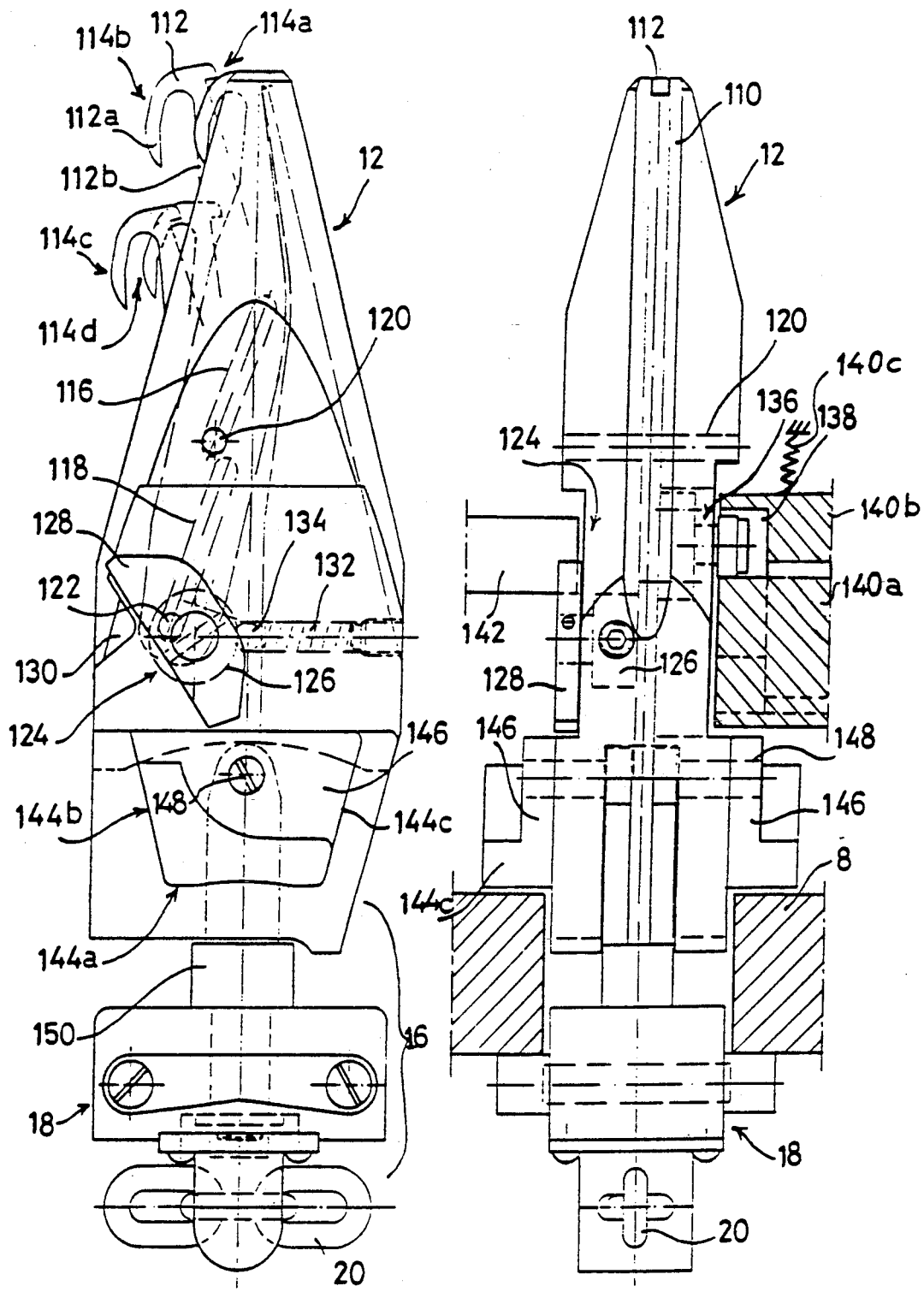
FIG. 4 shows a side view of a supporting element, in which side view various working positions of a hook are indicated.
FIG. 5 shows a rear view of the supporting element according to FIG. 4.

FIGS. 4, 5 and 6 illustrate the layout and mode of operation of a supporting element 12. The truncated cone-shaped top side of the supporting element 12 is adapted for receiving the inside of the chest of a front half of a slaughtered bird, the front half being positioned in such a way that the side of the backbone of the front half facing the belly cavity lies in a groove 110. Of course, the breastbone of the front half in that case lies at the opposite side of the truncated cone-shaped part of the supporting element at the position of a hook 112. The hook 112, which is essentially U-shaped and comprises a short leg 112a and a long leg 112b, can be moved both in the transverse direction and in the longitudinal direction relative to the surface of the truncated cone-shaped part of the supporting element 12, from the position which is indicated at 114a through the position which is indicated at 114b and the position which is indicated at 114c to the position which is indicated at 114d. For this, the long leg 112b of the hook 112 is provided with two slotted holes 116 and 118, which interact with pins 120 and 122, respectively. The pin 120 is fixed in the supporting element 12, while the pin 122 is fitted eccentrically on a hinge element 124 comprising a roller 126 and a lever 128. The lever 128 and the roller 126 fixed thereto can assume two different positions when the lever is resting against a stop 130 of the supporting element, each position being semi-permanently secured by means of a ball 134 pressed by means of a spring 132 into suitable recesses of the cylindrical surface of the roller 126. When the lever 128 tilts from one position to the other, the long leg 112b of the hook 112 will tilt about the pin 120. The hook 112 will thus tilt to position 114b from the position 114a shown in FIG. 4. A cam 136, which can produce a movement of the hook in the longitudinal direction of the slotted holes 116 and 118, is fixed on the long leg 112b of the hook 112. Such a movement could be brought about, for example, in the way shown schematically in FIG. 5 by means of a downwards sloping curved track 138 in a control element 140a, 140b extending next to the path of the supporting element 12 and parallel thereto. The control element has a stationary bottom part 140a, and a top part 140b which is movable relative to the bottom part 140a against the force of a resilient member 140c only indicated schematically. It will be clear that it is possible to turn the lever 128 from the position shown in FIG. 4 to a position rotated 90° in the clockwise direction by making the top side of the lever 128 knock against a stop 142 projecting in the path of the lever 128 during a movement of the supporting element 12.

At the beginning of the rails 8 (see FIG. 1) the hook 112 is at first almost completely sunk in the supporting element 12 in the position 114a which is shown in FIG. 4. After the placing of a front half on the supporting element, the supporting element passes through the first control station 32, in which the hook is moved by means of the lever 128 and the control cam 136 in such a way that in succession it assumes the positions 114a, 114b, 114c and 114d. The part of the path from position 114b to position 114c will only be travelled until the point where the front half is wedged securely on the supporting element 12, which point may differ from one bird to another and depends on the actual dimensions of the front half. This particular self-adapting feature is accomplished by making the top part 140b movable against the force of the resilient member 140c. It will be clear that the self-adapting feature of the supporting element 12 can also be implemented by providing the long leg 112b of the hook 112 with a longitudinally resilient portion, e.g. above the groove 116; in the latter case the control element parts 140a and 140b may be integral. Finally, it is conceivable that the top part 140b of the control element is not mounted, and the hook 112 lowers by its own weight from position 114b to position 114c, taking along a front half until a wedging of the front half on the supporting element is reached. In position 114d the hook 112 is brought firmly around and to some extent into the breastbone of the front half, which front half as a result of the fixing is fixed immovably on the supporting element 12, and is thus integral therewith. The shape of the hook 112, the grooves 116 and 118 and the remaining part of the control mechanism is selected in such a way that in the position 114d of the hook 112 a self-locking fastening of the front half on the supporting element 12 is obtained. The hook 112 is in fact secured against too far a downward movement by the top end of the groove 116, while the slightly diverging direction of the grooves 116 and 118 relative to the truncated cone-shaped surface ensures that the hook cannot move upwards, since the breastbone lies between the curved hook end of the short leg 112a of the hook 112 and the cone-shaped surface of the supporting element 12.

In the neutral position of the supporting element 12, when it moves forward it slides by means of a surface 144a of projections 146, situated on either side of the supporting element 12, over the top side of the rails 8 and the rails 98, 6 and 10. In the back position of the supporting element 12, in which the side of the back of the front half faces away from the rails 8, the supporting element 12 is tilted about shaft 148, and it moves along with a contact between surface 144b of projection 146 and the top side of rails 8. In the breast position of the supporting element 12, in which the breast side of the front half faces away from the rails 8, the supporting element 12 is tilted in the opposite direction in such a way about the shaft 148 that the face 144c of the projections 146 is in contact with the top side of the rails 8.

Where the case arises, an arrangement can be made for removing the lateral confinement of the supporting element 12 between the rails 8, so that a rotation of the supporting element 12 about the shaft end 150 situated in the foot 6 of the supporting element is possible.

FIGS. 7 and 8 show a motor 86 on a shaft 162, of which a drive wheel 164 is mounted by means of a splined connection. A belt 166 passed round the drive wheel 164 drives a shaft 168 by means of a second drive wheel 170, which is also connected by means of a splined connection to the shaft 68 in such a way that it cannot rotate relative to this shaft. In order to prevent soiling and to avoid danger for operating personnel, the belt 166 is accommodated in a casing 172 which is connected by means of a construction element 174 to the sub-frame 46 (see FIG. 2). The shaft 168 is supported by means of bearings 176 in a part of the casing 172. The rotary cutters 84 mentioned earlier are fixed at both ends of the shaft 168.

The way in which the device works and the operations to be carried out successively on the front half will now be explained with reference to FIGS. 9–19.

Figure 9:
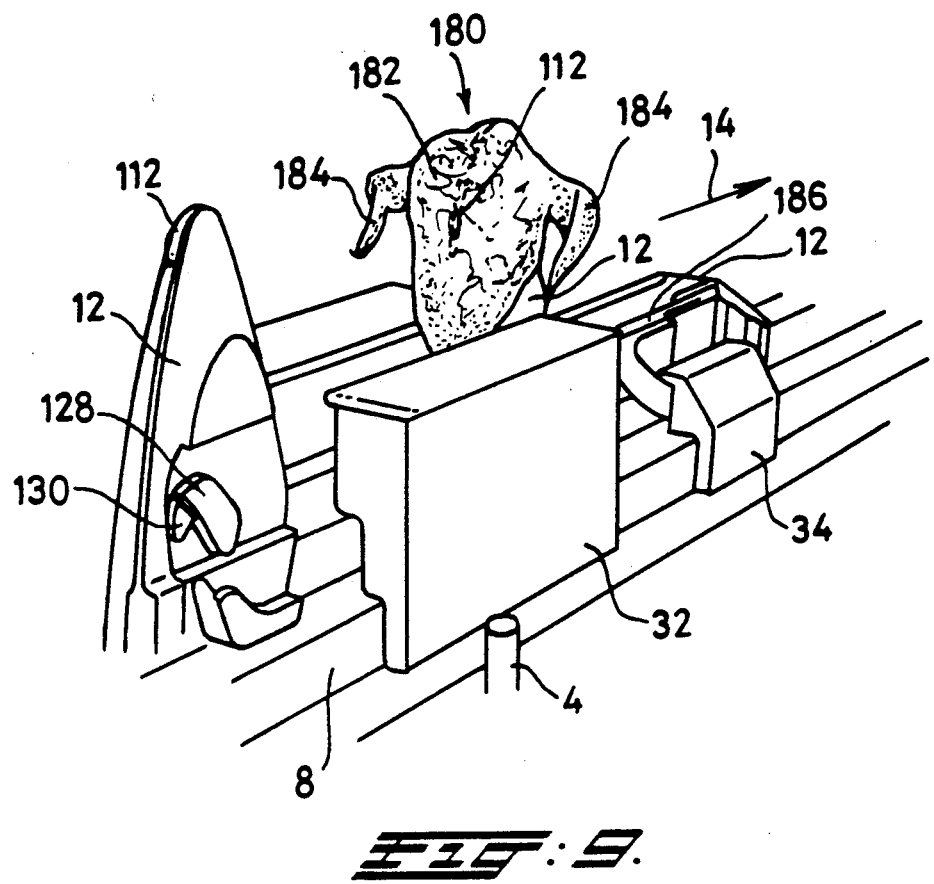
FIG. 9 shows an elevation in perspective of a station for fixing front halves of slaughtered birds on the supporting elements, and a tilting station.

FIG. 9 shows the position in which a front half 180, comprising a body part 182 and wings 184, is placed on a supporting element 12 at the beginning of the rails 8. When the supporting elements 12 are conveyed in the direction of the arrow 14, the supporting element 12 first passes the hook operating station 32, where the hook 112 of each supporting element 12, through operation of the lever 128 and the cam 136 thereof, runs through a path comprising in succession the positions 114a, 114b, 114c and 114d (see FIG. 4). The front half 180 is hereby fixed immovably on the supporting element 12 at the position of the breastbone. For the sake of clarity, in FIG. 9 and subsequent figures only one supporting element 12 is provided with a front half 180; it will, however, be clear that in the normal operating state each supporting element 12 on the rails 8 will be provided with a front half 180. After the hook operating station 32, in which a curved track such as 138 and an operating cam such as 142 (see FIG. 5) are accommodated, each supporting element 12 passes the first tilting station 34, at the position of which a supporting element 12 is tilted in such a way that the back of the front half 180 faces upwards. From the hook operating station 32 a guide rod 186 projects in the direction of the first tilting station 34, for guiding the wings 184 of the front half 180, in order to prevent the wings 184 from becoming jammed between the first tilting station 34 and the supporting element 12 passing there, and thus jeopardising the proper functioning of the device.

FIGS. 10 and 11 illustrate the way in which, after the first tilting station 34 has been passed, incisions are made on either side of the backbone of the front half 180 using the cutting device 36. For this, a supporting element 12 with a front half 180 fixed thereon first passes, as FIG. 10 shows, a guide 190, which is connected to support rods 4 of the frame of the device and guides the back of the front half to a set of rotating cutters 192a and 192b. The axial distance between the cutters 192a and 192b is about 5 mm, with the result that on a movement of the loaded supporting element 12 in the direction of the arrow 14 along the rails 8 two incisions 194 are made extending parallel to the backbone of the front half 180.

With a suitable height setting of the cutters 192a and 192b a cut is made through the skin and into the underlying tissue, without the underlying bone tissue being touched. The cutters 192a and 192b are supported on a shaft 196 which is driven, by means of a transmission not shown in any further detail, by a motor not shown in any further detail. It should be pointed out that the supporting element 12 shown in the neutral position in FIG. 11 is tilted into this position after passing the tilting station 38 (see FIG. 1). Further, it should be pointed out, that the device shown in FIGS. 10 and 11 might just as well be used for cutting in half the breast fillet of the front half 180 when the supporting element 12 is tilted in the breast position thereof instead of the back position as shown in said figures. It will be clear that, with the supporting element 12 in the breast position, the guide 190 and the cutters 192a and 192b can be easily set to cut along the breast bone of the front half for halving the breast fillet of the front half.

Figure 12:
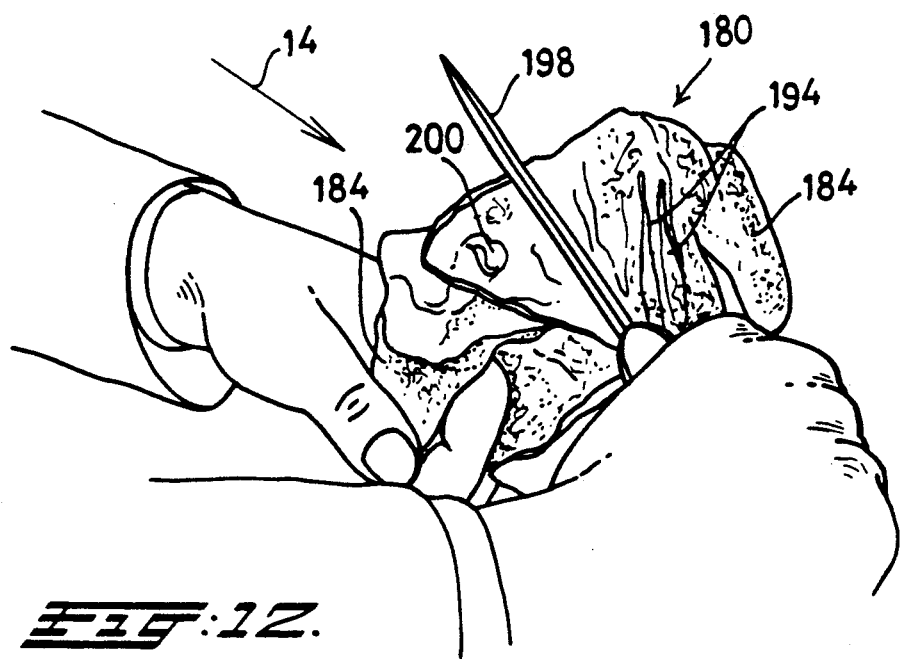
FIG. 12 illustrates the severing of the shoulder joint of a front half.

FIG. 12 shows the making of incisions by hand through one of the shoulder joints from the wishbone at the breast side to the shoulder blade at the back. The supporting element on which the front half 180 is fixed is in its neutral position while this operation is being carried out, so that with the knife 198 the intended incision can be made with the minimum of effort between the oval joint ball 200 at the wing side and the joint socket at the chest side of the shoulder joint. The oval joint ball 200 of the shoulder joint at the side of the wing 184 can be seen clearly in the figure.

Figure 13:
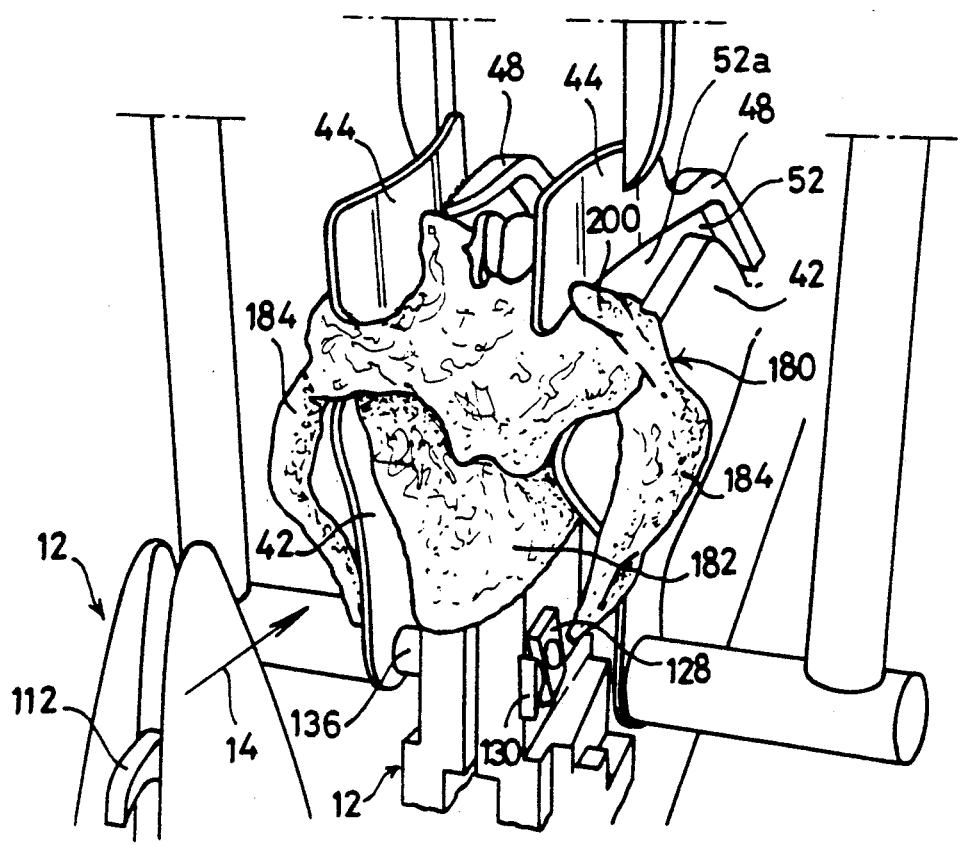
FIG. 13 shows an elevation in perspective of a feed section of a filleting station.

FIG. 13 shows the moment at which a front half 180 fixed on a supporting element 12 is conveyed into the filleting station shown in FIG. 2. The tapering feed end 52a of the guide groove 52 ensures that the wing bone with the oval joint ball 200 of each wing 184 is fed to the side of the groove 52 facing away from the body part 182, so that a force can be exerted on the wing bone near the point of attachment of the breast muscle irrespective of the characteristics or any defects of the wings 184.

FIGS. 14-17 show successive stages of the tearing away of the breast fillet (pectoralis major) during the operation in the filleting station of the device.

In the stage shown in FIG. 14, which corresponds to the stage shown in FIG. 13, the front half including the wings is moved along through the fact that the supporting element 12 moves along the rails 8 in the direction of the arrow 14. The wings 84 of the front half here lie completely on the outside of the guide grooves 52, as already illustrated in FIG. 13.

In the stage shown in FIG. 15 supporting element 12a has just passed the third tilting station 40, and has been tilted by it in such a way that the breast side of the front half is facing upwards. The body part of the front half which is fixed on the supporting element 12a follows its course in the direction of the arrow 14, while the wings 184 are retained at the outside of the guide grooves 52 by blocking rods 76. The envisaged action for tearing away the breast fillet from the front half is obtained in this way.

After the supporting element 12a has moved sufficiently from the position shown in FIG. 15 in the direction of the arrow 14, the blocking rod 76 is lifted by the curve track control at the inside of disc 72, with the result that the guide groove 52 is cleared for a short time. At the same time, first pushing elements 68 moving in the direction of the arrow 66 push the wings 184 along in the guide grooves 52, so that said wings are moved upwards along the guide grooves. It can be seen from FIG. 16 that the wings 184 and the other part of the front half fixed on the supporting element 12a move along in diverging directions, with the result that, after passing a separating rod 210 extending between the lower guide plates 42, the wings 184 with the breast fillet connected to them and hanging between the lower guide plates 42 are separated completely from the other part of the front half situated on the supporting element 12a. The blocking rod 76 is in the meantime returned to its initial position, as shown in FIG. 16.

Figure 16A:
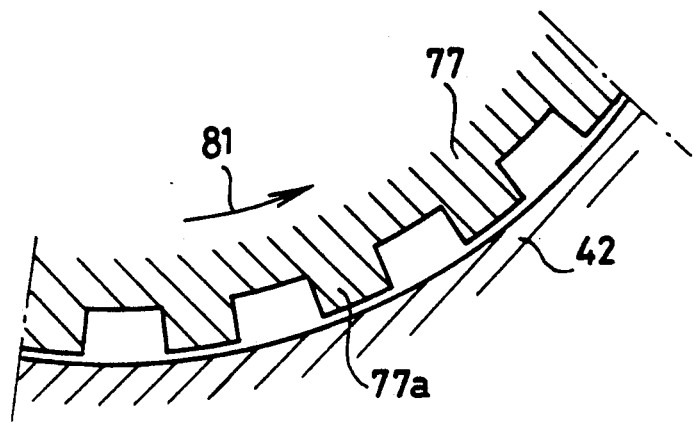
FIG. 16a illustrates a first alternative embodiment of a part of the filleting station according to FIG. 14.
Figure 16B:
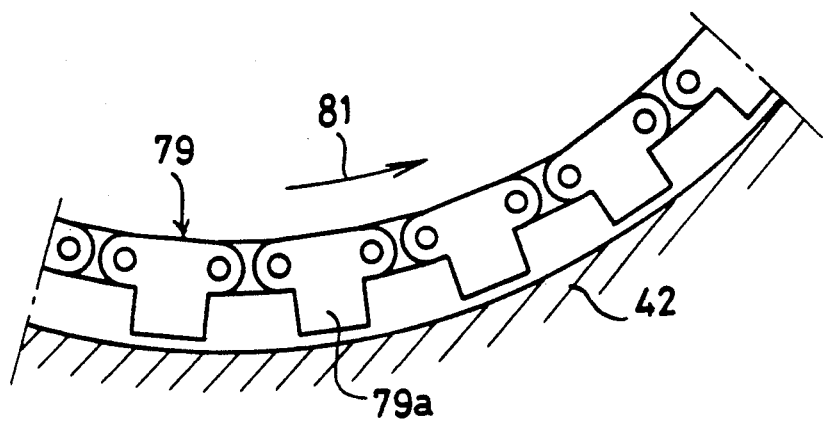
FIG. 16b illustrates a second alternative embodiment of a part of the filleting station according to FIG. 14.

As shown schematically in FIGS. 16a and 16b, the combination of a guide 48, a first pushing element 68 and a blocking rod 76 can be replaced if desired by a disc 77 which is provided with teeth 77a directed towards the edge of the lower guide plate 42. It is ensured here that the sum of the height of a tooth 77a and the play between a tooth and the lower guide plate 42 is smaller than the smallest dimension of the wing bone near the point of attachment of the breast muscle. The teeth 79a of a chain 79 in FIG. 16b are also dimensioned in the same way, while the chain 79 can be supported and driven at the side facing away from the bottom guide plate 42. The movement of the disc 77 and the chain 79 takes place in the direction of the arrow 81. It will be clear that the teeth 77a and 79a can both cause and block a movement of the wings carried along by them.

The wings 184 with the breast fillet connected to them can be conveyed by the first pushing elements 68 only to the beginning of the outlet end 52b of the guide groove 52, following which by means of rods 78 the second pushing element, working in the space between the groove outlet ends 52b, conveys the breast fillet and the wings 184 further in the direction of the cutters 84, as FIG. 17 shows.

The situation shown in FIG. 17 is shown in detail in FIG. 18. The stop 92 ensures that the oval joint ball 200 can pass the gap between the stop 92 and the cutter 84 rotating in the direction of the arrow only in the position shown, while the wings 184 are cut away from the breast fillet near the attachment of the breast muscle in such a way that the breast fillet contains as much tissue as possible. The breast fillet then falls onto the breast fillet conveyor belt 90 and is collected next to the device and possibly processed further and packed. The wings 184 fall onto the wing conveyor belts 88 and are also taken away from the device, collected, and possibly further processed and packed.

The part of the front half still on the supporting element 12a is then, as shown in FIG. 19, further filleted by hand using a knife 212, in order to obtain the underfillets (pectoralis minor). Finally, as can also be seen from FIG. 3, the supporting element 12a is placed in its neutral position through passing the fourth tilting station 94, and the part of the front half still on the supporting element 12a is released from the supporting element 12a in the ejection station 96. This takes place by moving the hook 112 of the supporting element 12a in succession from the position 114d shown in FIG. 4 to the positions 114c, 114b and 114a. In this case stops 214 (FIG. 3) prevent the remaining part of the front half from moving along with the hook. In the position 114a of the hook 112 the end of the hook is sunk under the truncated cone-shaped end of the supporting element 12a, and consequently it is simple to push the remaining part of the front half upwards off the supporting element 12a simply by moving the supporting element 12a through the ejection station 96.

In FIGS. 20a and 20b an optional neck part separating station is shown which can be disposed along the set of rails 8 at a place where the breast fillet and underfillets have already been removed from the carcass, but before the carcass is removed from the corresponding supporting element 12. The front half has been brought in and is conveyed in the back position of the supporting element 12 moving in the direction of the arrow 14. Firstly, as seen in the direction of arrow 14, the neck part separating station comprises a set of stationary cutters 220 disposed above the rails 8 fixed on support blocks 222 at a predetermined height relative to the supporting element 12 and having tapering cutting edges 224. The cutters 220 provide an incision on both sides of the front half, one of which incisions is indicated with dashed line 225 in FIG. 20b. At one side of the transport track defined by the rails 8, a hammer-like separating element 226 is provided, which separating element is rotatable in a horizontal plane in the direction of arrow 227 on a shaft 228 which is driven by a motor (not shown) at a predetermined speed. The path of the separating element 226 crosses the path of the front half wedged on the supporting element 12, above the supporting element at the height of the neck part 230 of the front half. The movements of the supporting element 12 and the separating element 226 are synchronized in such a way, that the separating element, moving at a higher speed than the supporting element, hits the neck part of the front half when the separating element 226 extends essentially perpendicularly to the longitudinal direction of the rails 8. The force of the impact is chosen such that the neck part 230 breaks off the rest of the front half along the incisions 225. The neck part is then collected and processed further, in particular for harvesting the small amount of meat of the neck part. For clarity, protective covers set up around the neck part processing station are not shown in FIGS. 20a and 20b.

While the invention has been described and illustrated in its preferred embodiment, it should be understood that departures may be made therefrom within the scope of the invention, which is not limited to the details disclosed herein.

What is claimed is:

1. A method for filleting the body of a slaughtered bird or a part thereof, comprising the following steps: making incisions in the shoulder joints while the connection between the muscles to be filleted and their wing bones remains essentially intact;
    tearing away a fillet from the ribs by exerting a pressure force on the wing bone near the point of attachment of the muscle, which force is directed essentially away from the ribs; and
    breaking the connection between fillet and wing bone.

2. A method according to claim 1, wherein prior to making the incisions in the shoulder joints, incisions are made through the skin on either side of the backbone, which incisions extend from the neck to the other end of the backbone and parallel thereto.

3. A method according to claim 1, wherein the incisions extend through the two shoulder joints from the wishbone at the breast side to the shoulder blade at the back.

4. A method according to claim 1, wherein the bird or a part thereof is fixed on a supporting element which is movable along a predetermined path at a predetermined speed, and which can be tilted from a neutral position, in which the shoulder side of the bird is facing upwards, to a breast position, in which the breast side of the bird is facing upwards, and to a back position in which the back of the bird is facing upwards.

5. A method according to claim 4, wherein the supporting element is disposed so that it pivots about an axis perpendicular to the direction of movement.

6. A method according to claim 1, wherein the contour of the wing bone near the point of attachment of the muscle is followed during the breaking of the connection between fillet and wing.

7. A device for filleting the body of a slaughtered bird or a part thereof, comprising
    a conveyor to which a number of supporting elements are connected, which supporting elements are for fixing thereon the slaughtered bird or a part thereof;
    a shoulder joint incision station for cutting into the shoulder joints, while the connection between the muscles to be filleted and their wing bones remains essentially intact;
    a filleting station with a second conveyor for guiding the wings away from the path of the supporting elements in such a way that the muscle which is connected to each wing and is to be filleted is torn away from the ribs connected to the supporting element, the second conveyor comprising a set of guides, each with a guide edge, which guide edges are adapted for contacting the wing bone or covering tissue thereof near the point of attachment of the muscle on either side thereof, while the guides run in such a way that prior to the fillet being torn away the wing is guided to the side of the guides facing away from the ribs; and
    a separating device for separating the wings from the fillet.

8. A device according to claim 7, wherein the guides form a groove, and provision is also made for a pushing element which can be moved along the groove, for moving the wing in the longitudinal direction of the groove.

9. A device according to claim 7, wherein the guides are formed by a continuous guide edge, in the longitudinal direction of which a guide element provided with projections facing the guide edge can be moved, for moving the wing in the longitudinal direction of the guide edge.

10. A device according to claim 9, wherein the guide element comprises a disc which is provided with radially directed projections along the periphery.

11. A device according to claim 9, wherein the guide element comprises a chain with projections directed at right angles to the links thereof.

12. A device according to claim 7, wherein a back incision device is disposed upstream of the filleting station along the path of the conveyor.

13. A device according to claim 12, wherein the back incision device comprises two cutting elements placed at a distance from each other and operating in parallel.

14. A device according to claim 7, having a supporting element with a tapering end which is adapted for supporting a part of the body of the bird at the inside thereof, and with a base which is guided on either side between a set of rails, the bases of the supporting elements being interconnected by means of a chain or the like.

15. A device according to claim 14, wherein the supporting elements are connected to the bases thereof in such a way that they pivot about a horizontal axis, the supporting elements being provided on either side with three slide surfaces which are directed perpendicular to a vertical plane, and which can interact with the top side of the rails, for holding the supporting element tilted in a position determined by one of the three slide surfaces during the conveyance thereof along the rails.

16. A device according to claim 14, wherein the base of the supporting element is connected to the remaining portion of the supporting element in such a way that it can pivot about a vertical axis relative to the base thereof.

17. A device according to claim 14, comprising a supporting element with a hook of which the end is directed towards the base of the tapering end, and is adapted to clamp the part of the body of the bird on the supporting element, and which hook is adapted to be moved in the longitudinal and transverse direction relative to the surface of the tapering end by means of control elements connected thereto which are adapted to interact with control stations disposed along the path of the supporting element.

18. A device according to claim 17, wherein the hook is slidable in the direction of the surface of the tapering end towards the base thereof under the force of a resilient member.

19. A device according to claim 17, wherein the hook is U-shaped and has a short leg and a long leg, which long leg lies essentially inside the supporting element and is both tiltable and slidable for moving the short leg in the longitudinal and transverse direction relative to the surface of the tapering end.

20. A device according to claim 19, wherein the long leg of the hook is composed of a strip with two essentially parallel grooves which are directed essentially parallel to the surface of the cone-shaped end, a first guide pin fixed to the supporting element projecting into the first groove perpendicular to the plane of the strip, and a second guide pin which is disposed eccentrically on a hingable element projecting into the second groove.

21. A device according to claim 20, wherein the short leg of the hook can be moved along the path determined by the grooves and the first and second guide pins when the hingable element is in a particular position, along the surface of the cone-shaped end of the supporting element, by a first hook operating element which is connected to the strip and can interact with a control station disposed next to the path of the supporting element.

22. Device according to claim 20, wherein the short leg of the hook can be moved along the path determined by the grooves and the first and second guide pins, at right angles to the surface of the cone-shaped end of the supporting element, by a second hook operating element which is connected to the hingable element and can interact with a control station disposed next to the path of the supporting element.

23. A device according to claim 7, wherein the separating device for separating the wings from the fillet comprises a set of guides, each with a guide edge, which guide edges are designed to rest against the wing bone or covering tissue thereof near the point of attachment of the muscle at either side thereof, the guides running in such a way that, prior to the separation of the wing from the fillet, the wing is guided to the side of the guides facing away from the ribs, which guides are bounded downstream by a cutting element for cutting off the fillet.

24. A device according to claim 23, wherein the guides form a groove, and wherein a pushing element which can be moved along the groove is provided, for moving the fillet and the wing in the longitudinal direction of the groove.

25. A device according to claim 23, wherein the guides are formed by a continuous guide edge, in the longitudinal direction of which a guide element provided with projections facing the guide edge can be moved, for moving the fillet and the wing in the longitudinal direction of the guide edge.

26. A device according to claim 25, wherein the guide element consists of a disc which is provided with radially directed projections along the periphery.

27. A device according to claim 25, wherein the guide element comprises a chain with projections directed at right angles to the links thereof.

28. A device according to claim 24, comprising a stop disposed at a side of the guides facing away from the ribs, the distance between the stop and the guides being smaller than the greatest dimension and greater than the smallest dimension of a wing bone near the point of attachment of the muscle to be filleted.

* * * * *